(12) United States Patent
Tseng et al.

(10) Patent No.: US 11,196,619 B2
(45) Date of Patent: Dec. 7, 2021

(54) NETWORK SYSTEM CAPABLE OF ADJUSTING SIGNAL TRANSMITTING PATH

(71) Applicant: Sercomm Corporation, Taipei (TW)

(72) Inventors: Chih-Wen Tseng, Taipei (TW); Chuanqi Luo, Taipei (TW); Lin Cheng, Taipei (TW)

(73) Assignee: Sercomm Corporation, Taipei (TW)

( * ) Notice: Subject to any disclaimer, the term of this patent is extended or adjusted under 35 U.S.C. 154(b) by 123 days.

(21) Appl. No.: 16/807,022

(22) Filed: Mar. 2, 2020

(65) Prior Publication Data

US 2020/0322213 A1 Oct. 8, 2020

(30) Foreign Application Priority Data

Apr. 2, 2019 (CN) .......................... 201910268276.0

(51) Int. Cl.
*H04L 12/24* (2006.01)

(52) U.S. Cl.
CPC ................. *H04L 41/0668* (2013.01)

(58) Field of Classification Search
CPC ...... H04L 41/12; H04L 45/16; G06F 13/4247
See application file for complete search history.

(56) References Cited

U.S. PATENT DOCUMENTS

| | | | | |
|---|---|---|---|---|
| 9,344,493 B1* | 5/2016 | Anand | ................... | G06F 9/5077 |
| 2003/0021235 A1* | 1/2003 | Arima | ................ | H04L 12/40052 |
| | | | | 370/244 |
| 2003/0189919 A1* | 10/2003 | Gupta | ..................... | H04L 41/12 |
| | | | | 370/351 |
| 2004/0085893 A1* | 5/2004 | Wang | .................... | H04L 49/552 |
| | | | | 370/216 |
| 2004/0105390 A1* | 6/2004 | Saksio | ................ | H04L 41/0677 |
| | | | | 370/245 |
| 2006/0095592 A1* | 5/2006 | Borkenhagen | ...... | G06F 13/1673 |
| | | | | 710/2 |
| 2008/0130491 A1* | 6/2008 | Chao | ....................... | H04L 45/22 |
| | | | | 370/225 |

(Continued)

FOREIGN PATENT DOCUMENTS

CN 101978658 A 2/2011
CN 105099743 A 11/2015
(Continued)

*Primary Examiner* — Romani Ohri
(74) *Attorney, Agent, or Firm* — Winston Hsu

(57) ABSTRACT

A network system comprising: a control node; a first head node, comprising a first head forward port, a first head backward port and a first head backup port, wherein the first head forward port is connected to the control node; a first ordinary node, comprising a first forward port, a first backward port and a first backup port, wherein the first forward port is connected to the first head backward port; a second ordinary node, comprising a second forward port, a second backward port and a second backup port, wherein the second forward port is connected to the first backward port; and a third ordinary node, comprising a third forward port, a third backward port and a third backup port, wherein the third forward port is connected to the second backward port, wherein the third backup port is connected to the first head backup port.

10 Claims, 5 Drawing Sheets

(56) References Cited

U.S. PATENT DOCUMENTS

| | | | |
|---|---|---|---|
| 2011/0013640 A1* | 1/2011 | Farkas | H04L 45/02 370/395.53 |
| 2015/0204044 A1* | 7/2015 | Botrie | C08G 18/4804 52/292 |
| 2018/0054324 A1* | 2/2018 | Yu | H04L 41/12 |
| 2018/0375717 A1* | 12/2018 | Nair | G06F 11/1423 |

FOREIGN PATENT DOCUMENTS

| | | |
|---|---|---|
| CN | 105896730 A | 8/2016 |
| CN | 107171815 A | 9/2017 |
| CN | 108073478 A | 5/2018 |

\* cited by examiner

NETWORK SYSTEM CAPABLE OF ADJUSTING SIGNAL TRANSMITTING PATH

CROSS REFERENCE TO RELATED APPLICATION

This application claims priority to China Application No. 2201910268276.0, filed 2019 Apr. 2, and incorporated herein by reference in its entirety.

BACKGROUND OF THE INVENTION

1. Field of the Invention

The present invention relates to a network system comprising a plurality of nodes, and particularly relates to a network system which can automatically adjust the signal transmitting path.

2. Description of the Prior Art

A conventional network system may comprise a plurality of nodes, which are used for signal transceiving and signal relaying. In some environments having long shapes, such as a tunnel or a road, these nodes are connected in series to provide a signal transmitting function. For example, a Daisy chain is such kind of communication system. Such network system still has some problems. For example, if one of the nodes connected in series fails or a network line is disconnected, no subsequent nodes can receive the signal transmitted by previous nodes, thus the network system could not normally operate.

SUMMARY OF THE INVENTION

Therefore, one objective of the present invention is to provide a network system which can automatically adjust a signal transmitting path.

One embodiment of the present invention discloses a network system comprising: a control node; a first head node, comprising a first head forward port, a first head backward port and a first head backup port, wherein the first head forward port is connected to the control node; a first ordinary node, comprising a first forward port, a first backward port and a first backup port, wherein the first forward port is connected to the first head backward port; a second ordinary node, comprising a second forward port, a second backward port and a second backup port, wherein the second forward port is connected to the first backward port; and a third ordinary node, comprising a third forward port, a third backward port and a third backup port, wherein the third forward port is connected to the second backward port, wherein the third backup port is connected to the first head backup port.

Another embodiment of the present invention discloses: a network system, comprising: a control node; a first head node, comprising a first head forward port, a first head backward port and a first head backup port, wherein the first head forward port is connected to the control node; a last node, comprising a last forward port, a last backward port and a last backup port, wherein the last backward port is not connected to any node; a plurality of ordinary nodes which are connected in series and not used as a head node and the last node, wherein each of the ordinary nodes comprises a forward port, a backward port and a backup port. The forward port of a first one of the ordinary nodes is connected to the first head backward port. The forward port of each one of ordinary nodes which are subsequent nodes of the first one of the ordinary nodes is connected to the backward port of a previous ordinary node. The backward port of a last one of the ordinary nodes is connected to the last forward port. The backup port of at least one of the ordinary node is connected to the backup port of the ordinary node, which is a subsequent node and separated by one or two nodes. The first head backup port is connected to the backup port of the ordinary node, which is a subsequent node of the first head backup port and separated by one or two nodes from the first head backup port.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
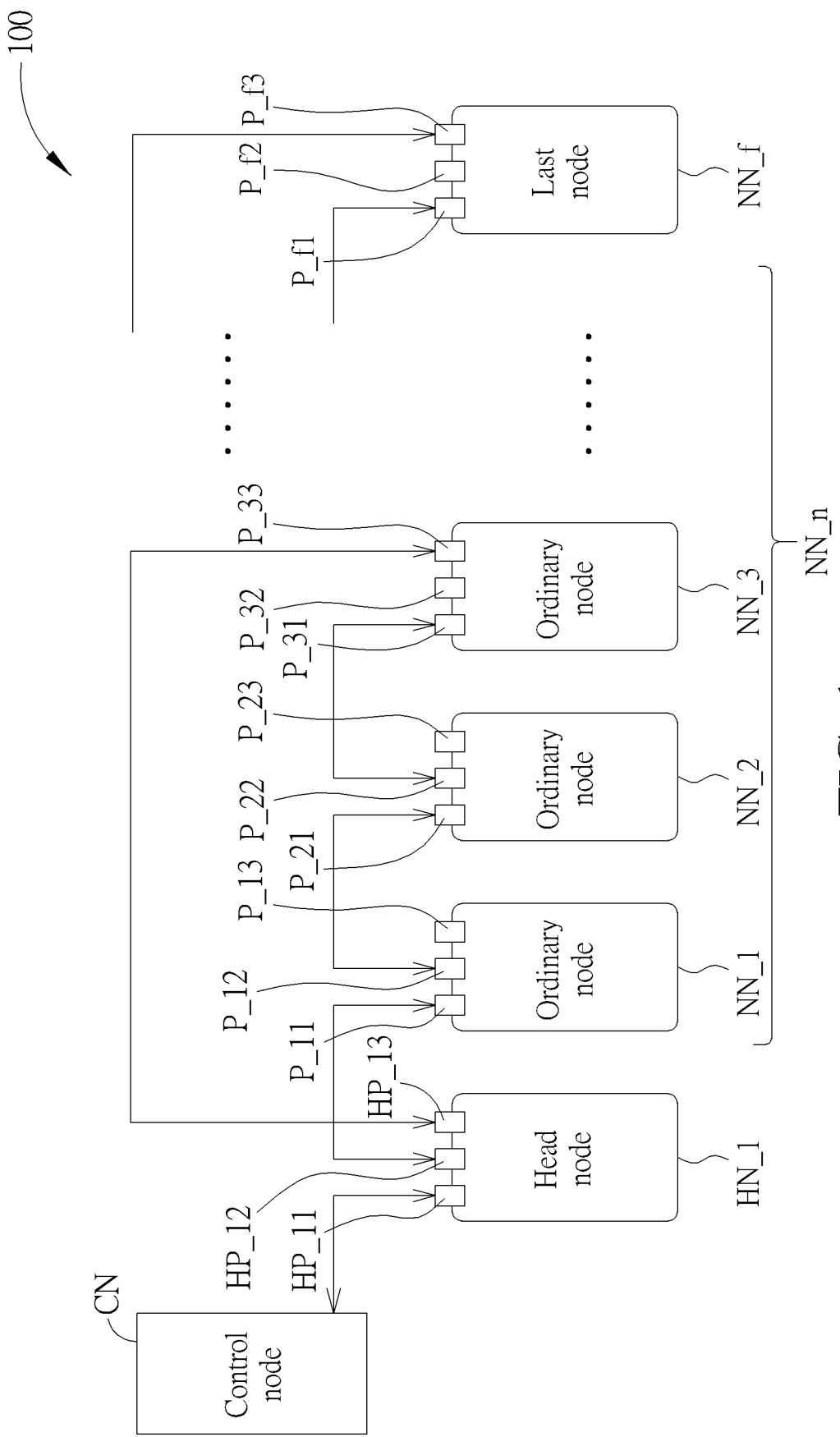
FIG. 1 is a schematic diagram illustrating a network system according to one embodiment of the present invention.

FIG. 1 is a schematic diagram illustrating a network system according to one embodiment of the present invention. As shown in FIG. 1, the network system comprises a control node CN, a first head node HN_1, a plurality of ordinary nodes NN_n (only three of them are shown in the diagram) which are not the last nodes, and a last node NN_f. f is a positive integer greater than or equal to four and n indicates f−1 positive integers comprising 1, 2, 3, . . . , f−1. The control node CN may be composed of one or more nodes, which is responsible for processing the signals transmitted to it by all nodes and sending commands to control all nodes. The head node is a node connected to the control node directly, and the number of the head node can be one or more. The embodiment in FIG. 1 comprises only one first head node HN_1. Each of the ordinary node NN_n which and is not a control node, a head node, or a last node. The embodiment of FIG. 1 comprises the first ordinary node NN_1, the second ordinary node NN_2, and the third ordinary Node NN_3, which can communicate with the control node CN via the first head node HN_1 and/or other ordinary nodes.

The network system itself or any of its nodes may be a mobile communication base station (such as a small cell or a NB-IoT or eMTC small communication base station supporting the Internet of Things functionality), a fiber optic gateway (such as GPON ONU), 802.11ac or 802.11ax WiFi wireless router, wireless access point, or wireless network card, a IoT gateway/device, or a positioning anchor/station/beacon using a positioning technology such as Ultra-wideband (UWB) positioning.

The first head node HN_1 comprises a first head forward port HP_11, a first head backward port HP_12, and a first head backup port HP_13. The forward direction here means a direction toward the control node CN, and the backward direction means a direction toward the last node NN_f. For example, the first head node HN_1 and the first ordinary node NN_1 are nodes previous to the second ordinary node NN_2, and the third ordinary node NN_3 is a node subsequent to the second ordinary node NN_2. In other words, HN_1 and NN_1 are NN_2's previous nodes while NN_3 is NN_2's subsequent node. The first head forward port HP_11 is connected to the control node CN. Each of the ordinary node NN_n comprises a forward port, a backward port, and a backup port. The forward port of each ordinary node NN_n is connected to the backward port of the previous ordinary node/head node, and the backward port of each ordinary node is connected to the forward port of the subsequent ordinary node/last node. Also, the backup port of at least one ordinary node is connected to the backup port of the subsequent ordinary node separated by two or more nodes, or connected to the backup port of the last node. In addition, the first backup port HP_13 is connected to the backup port of a subsequent node separated by two nodes or more. Please note, "separated by two nodes" is used as an example for explaining following descriptions.

In the embodiment of FIG. 1, the first ordinary node NN_1 comprises a first forward port P_11, a first backward port P_12, and a first backup port P_13. The first forward port P_11 is connected to the first backward port HP_12. The second ordinary node NN_2 comprises a second forward port P_21, a second backward port P_22, and a second backup port P_23. The second forward port P_21 is connected to the first backward port P_12. The third ordinary node NN_3 comprises a third forward port P_31, a third backward port P_32, and a third backup port P_33. The third forward port P_31 is connected to the second backward port P_22 and the third backup port P_33 is connected to the first head backup port HP_13.

The last node NN_f comprises a last forward port P_f1, a last backward port P_f2, and a last backup port P_f3. The last forward port P_f1 is connected to the backward port of a previous ordinary node of the last node NN_f, and the last backward port P_f2 is not connected to any other node. In addition, the last backup port P_f3 may be connected to a backup port of an ordinary node separated by one or two nodes from the last node NN_f. For example, if the embodiment in FIG. 1 comprises only three ordinary nodes, the last backup port P_f3 may be connected to the first backup port P_13. If the embodiment of FIG. 1 comprises only four ordinary nodes, the last backup port P_f3 may be connected to the second backup port P_23.

Based on the above-mentioned embodiment, the network system 100 can automatically adjust a signal transmission path when one or two of the ordinary nodes NN_n fail or one or two network lines are disconnected, so that other ordinary nodes can still normally communicate with the control node CN. For example, if the first ordinary node NN_1 fails, the first head node HN_1, the second ordinary node NN_2, the third ordinary node NN_3, and the last node NN_f can still communicate with the control node CN.

Figure 2:
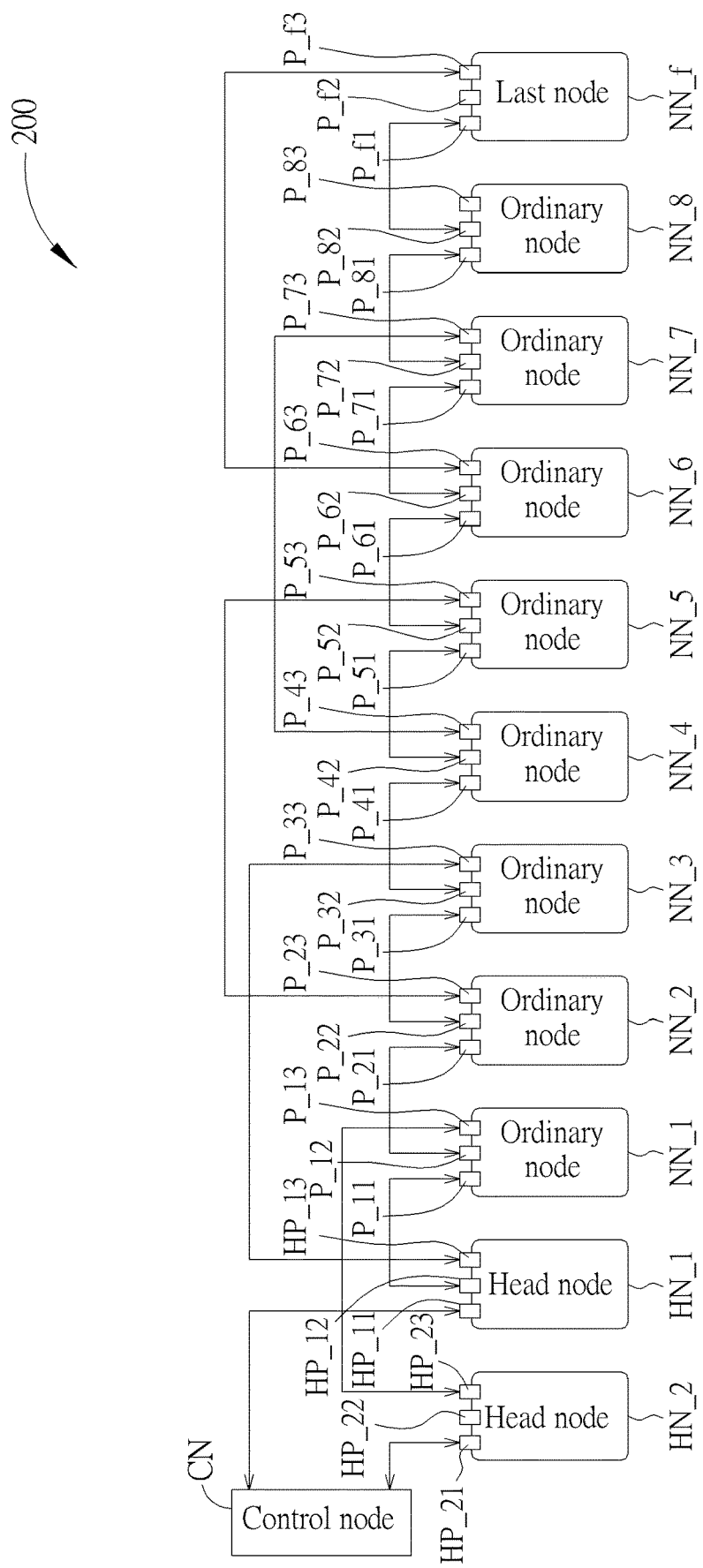
FIG. 2 is an example of a detail structure of the network system illustrated in FIG. 1.
Figure 3:
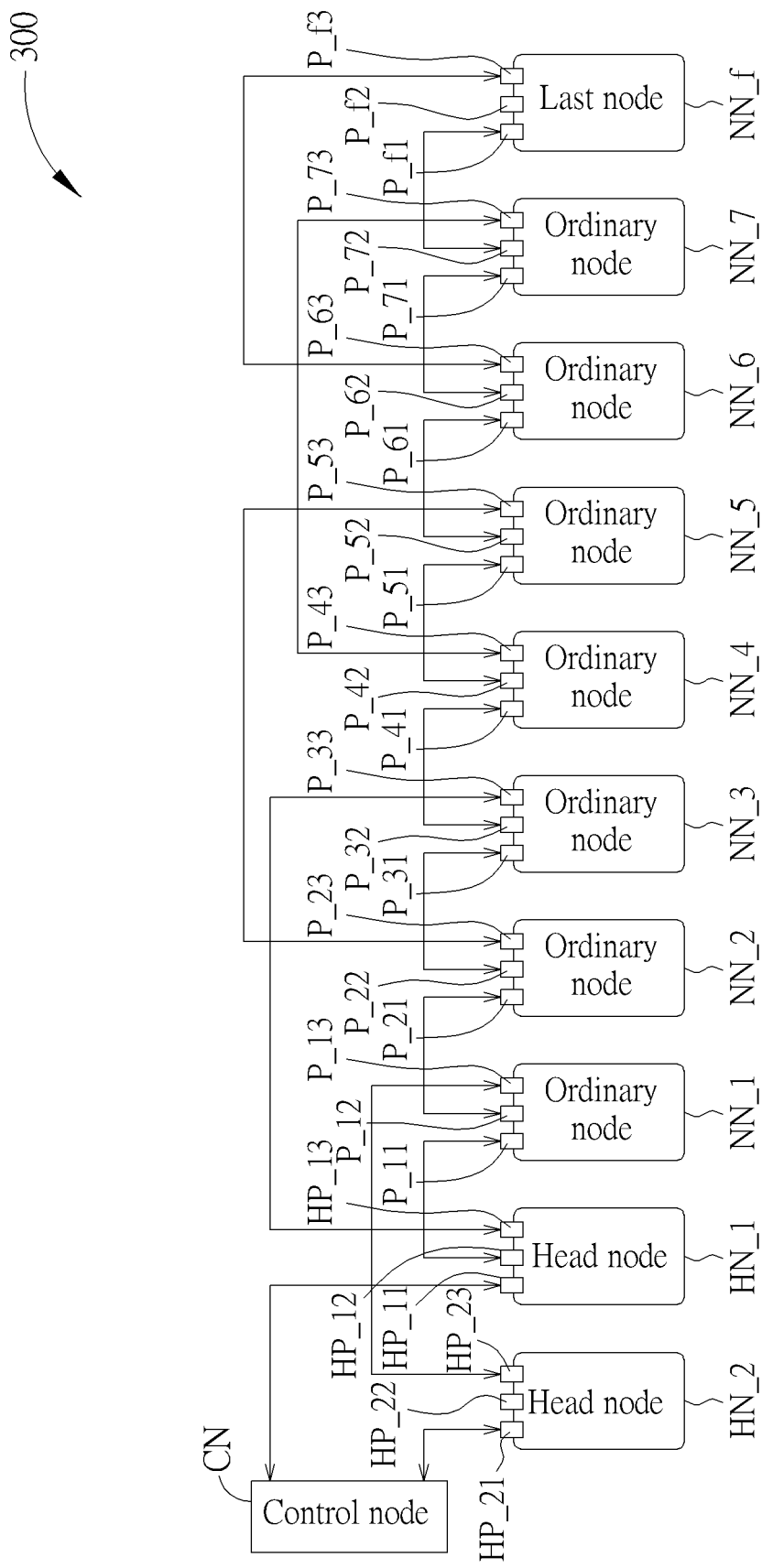
FIG. 3 is another example of a detail structure of the network system illustrated in FIG. 1.

Please also note that the topology of the network system provided by the present invention is not limited to the above-mentioned examples. For example, the network system provided by the present invention may comprise more than one head node or more than three ordinary nodes. FIG. 2 and FIG. 3 below show detail examples of the network system shown in FIG. 1.

In addition to the structure shown in FIG. 1, the embodiment of FIG. 2 further comprises the second head node HN_2, the fourth ordinary node NN_4, the fifth ordinary node NN_5, the sixth ordinary node NN_6, the seventh ordinary node NN_7, and the eighth ordinary node NN_8. The second head node HN_2 comprises the second head forward port HP_21, the second head backward port HP_22, and the second head backup port HP_23. The second head forward port HP_21 is connected to the control node CN, and the second head backup port HP_23 is connected to the first backup port P_13. Even if the first head node HN_1 fails, other nodes of the network system 200 can still communicate with the control node CN via the second head node HN_2.

The fourth ordinary node NN_4, the fifth ordinary node NN_5, the sixth ordinary node NN_6, the seventh ordinary node NN_7, and the eighth ordinary node NN_8 comprise corresponding fourth to eighth forward ports P_41 to P_81, fourth to eighth backward ports P_42 to P_82 and fourth to eighth backup ports P_43 to P_83, respectively. The fourth forward port P_41 is connected to the third backward port P_32, the fifth forward port P_51 is connected to the fourth backward port P_42, and the fifth backup port P_53 is connected to the second backup port P_23. Based on above-mentioned rules, the sixth to eighth forward ports P_61 to P_81 are respectively connected to the fifth to seventh backward ports P_52 to P_72 of previous ordinary nodes thereof. Also, the seventh backup port P_73 is connected to the fourth backup port P_43 (that is, the backup port of an ordinary node is connected to a backup port separated by two nodes).

In the network system 200, the last backup port P_f3 is connected to the sixth backup port P_63 of the sixth ordinary node NN_6 which is previous to the last node NN_f and separated by two nodes.

FIG. 3 discloses a network system 300 according to another embodiment of the present invention. Compared with the network system 200, the network system 300 does not comprise the eighth ordinary node NN_8, so the connection architecture of its last node NN_f is different. In FIG. 3, the last backup port P_f3 is connected to the sixth backup port P_63 of the six ordinary nodes NN_6, which is previous to the last node NN_f and separated by one node.

In the embodiments of FIG. 2 and FIG. 3, the backup ports of ordinary nodes with odd numbers (such as the third ordinary node NN_3 or the fifth ordinary node NN_5) are connected to backup ports of the ordinary node separated by two nodes previous to it or a backup port of a head node. The exception is the first ordinary node NN_1, whose backup port is connected to the second head backup port HP_23. The backup ports of ordinary nodes with even numbers (for example, the fourth ordinary node NN_4) are connected to backup ports of the subsequent ordinary node separated by two nodes, or connected to the backup port of the last node. The exception is the ordinary node with the maximum even number. If there is no node between the ordinary node with the maximum even number and the last node NN_f, its backup port is not connected to any node (the eighth ordinary node NN_8 in FIG. 2 is an example). Also, if there is only one node between the ordinary node with the maximum even number (for example, the sixth ordinary node NN_6 in FIG. 3) and the last node NN_f, its backup port is connected to the last backup port P_f3 of the last node NN_f.

Figure 4:
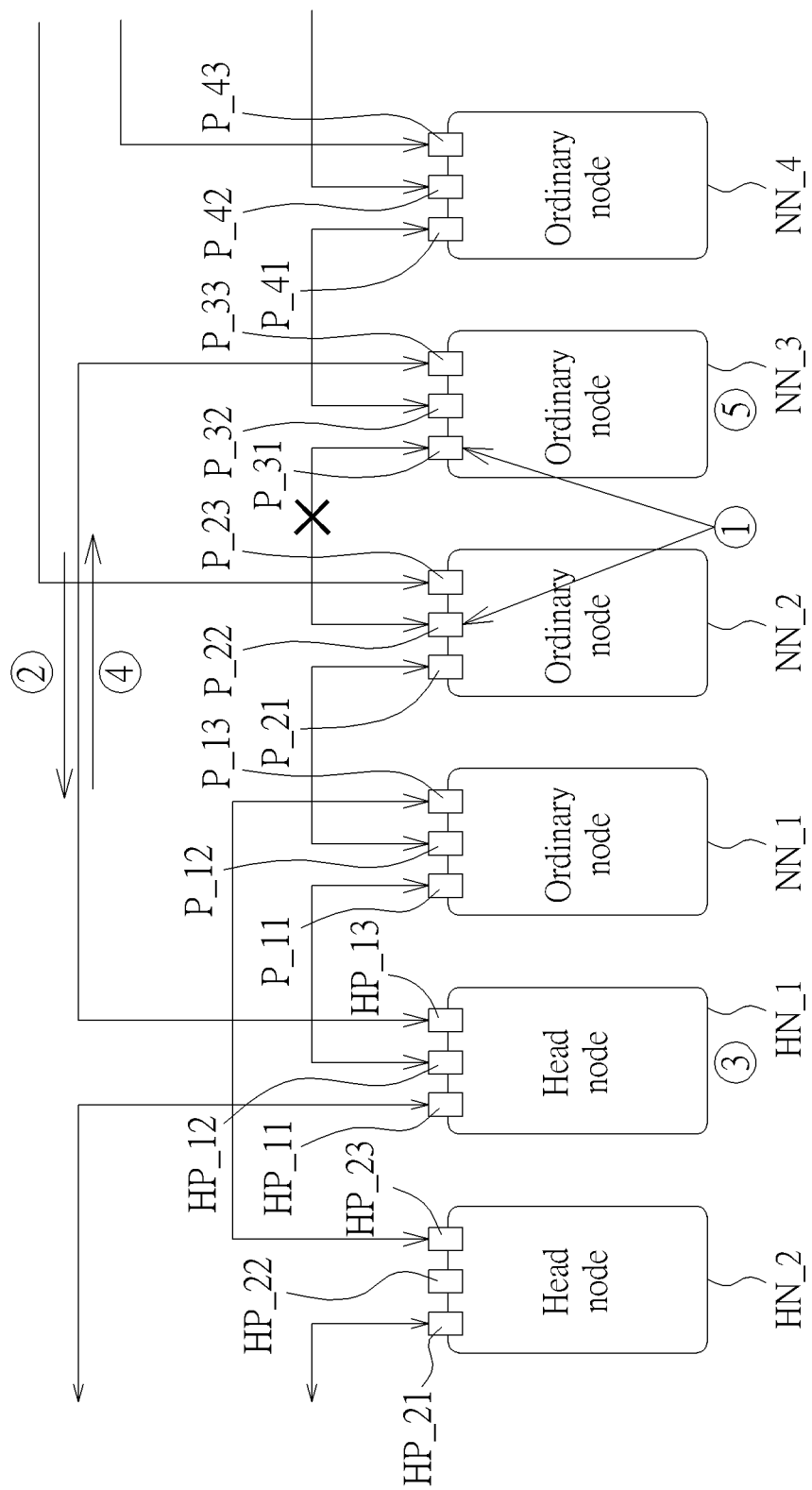
FIG. 4 is a schematic diagram illustrating the action of the network system when a signal transmitting path of the port of the network system is disconnected, according to one embodiment of the present invention.

FIG. 4 is a schematic diagram illustrating the action of the network system when a signal transmitting path of the port of the network system is disconnected, according to one embodiment of the present invention. In the example shown in FIG. 4, it is assumed that the signal transmission path between the second backward port P_22 and the third forward port P_31 is disconnected. In such case, the second ordinary node NN_2 and the third ordinary node NN_3 are both regarded as abnormal.

In the embodiment of FIG. 4, the network system periodically checks whether the port works normally by using routing information check timer. Therefore, if the signal transmission path between the second ordinary node NN_2 and the third ordinary node NN_3 is disconnected, the second ordinary node NN_2 and the third ordinary node NN_3 will find the corresponding port (the second backward ports P_22 and the third forward port P_31) are abnormal (step 1). After the port abnormality indication is triggered, the second ordinary node NN_2 will put the second backward port P_22 into the abnormal list, for example, into the abnormal VLAN (Virtual Local Area Network). Since the third backup port P_33 is used as the forward port, the third backup port P_33 will send a port abnormal notification packet (step 2). After receiving the packet, the first head node HN_1 will put the first backup port HP_13 into the working list (such as the working VLAN) (step 3) and send a port abnormal response packet to the third ordinary node NN_3 (step 4) through HP_13. After receiving this packet, the third ordinary nodes NN_3 will put the third backup port P_33 into the working list (step 5). By this way, the third ordinary node NN_3 and the node subsequent to it can form a signal transmission path through the third backup port P_33 and previous nodes of the third ordinary node NN_3. Briefly, when the port being used has a problem, the port and the port connected to it will be moved to the abnormal list, and the backup port will be activated to form a new signal transmission path. Also, the activated backup port will be put into the working list.

Figure 5:
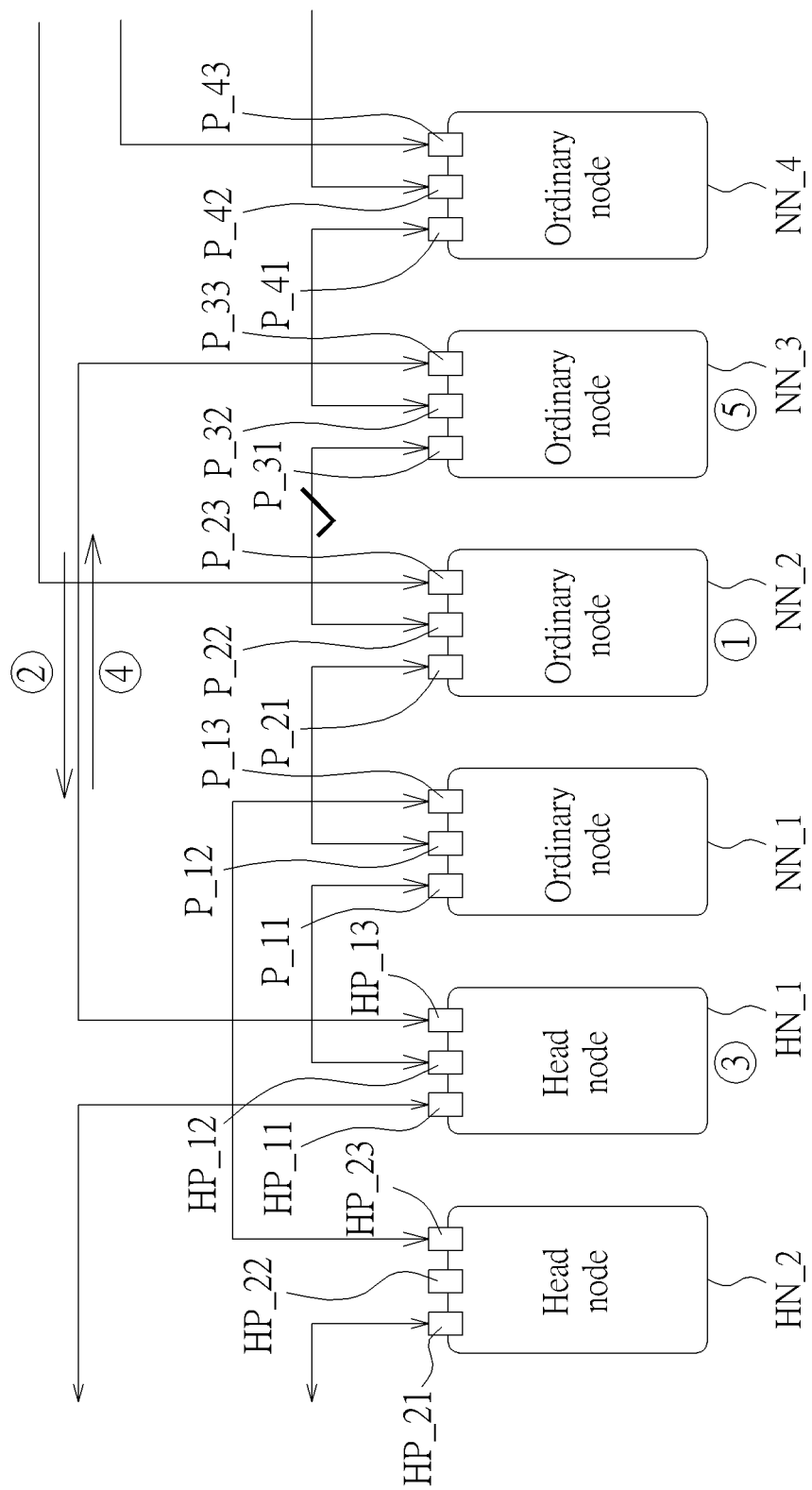
FIG. 5 is a schematic diagram illustrating the action of the network system when a signal transmitting path of the port of the network system is recovered, according to one embodiment of the present invention.

FIG. 5 is a schematic diagram illustrating the action of the network system when a signal transmitting path of the port of the network system is recovered, according to one embodiment of the present invention. Corresponding to the embodiment of FIG. 4, if the signal transmission path between the second backward port P_22 and the third forward port P_31 is recovered, the routing information check timer will cause the second ordinary node NN_2 and the third ordinary node NN_3 to find the corresponding ports (the second backward port P_22 and the third forward port P_31) have been recovered from the abnormality. The second ordinary node NN_2 will move the second backward port P_22 from the abnormal list to the working list (step 1). Since the third backup port P_33 is a forward port, the third backup port P_33 sends a port recovery notification packet (step 2). After receiving the packet, the first head node HN_1 will put the first forward port HP_11 and the first backward port HP_12 into the working list, and the first backup port HP_13 will be placed in the backup list (step 3). Also, the first head node HN_1 sends a port recovering response packet to the third ordinary node NN_3 (step 4). After receiving the packet, the third ordinary node NN_3 puts the third forward port P_31 and the third backward port P_32 to the working list, and puts the third backup port P_33 to the backup list (step 5). Via above-mentioned steps, the signal transmission path recovering process between the second ordinary node NN_2 and the third ordinary node NN_3 can be completed. Briefly, when the failed port is restored, the port and the port connected to it will be moved from the abnormal list to the working list, and the previously activated backup port will be moved to the backup list and become unused temporarily.

The signal transmission path disconnection flow and the signal transmission path recovery flow in FIG. 4 and FIG. 5 can be applied to network systems with other structures. However, please note that the network system provided by the present invention is not limited to using the signal transmission path disconnection process and signal transmission path recovery process of FIG. 4 and FIG. 5. The signal transmission path disconnection process and signal transmission path recovery process may be completed with different types of packets or different steps under different network standards.

In view of above-mentioned embodiments, the network system disclosed in the present invention can automatically adjust a signal transmission path to provide a normal signal transmission function when one or more nodes fail or one or more network lines are disconnected.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A network system, comprising:
a control node;
a first head node, comprising a first head forward port, a first head backward port and a first head backup port, wherein the first head forward port is connected to the control node;
a first ordinary node, comprising a first forward port, a first backward port and a first backup port, wherein the first forward port is connected to the first head backward port;
a second ordinary node, comprising a second forward port, a second backward port and a second backup port, wherein the second forward port is connected to the first backward port; and
a third ordinary node, comprising a third forward port, a third backward port and a third backup port, wherein the third forward port is connected to the second backward port, and the third backup port is connected to the first head backup port;
a second head node, comprising a second head forward port, a second head backward port and a second head backup port, wherein the second head forward port is connected to the control node, the second head backward port is not connected to any node, and the second head backup port is connected to the first backup port;
wherein the first ordinary node, the second ordinary node and the third ordinary node are connected in series.

2. The network system of claim 1, further comprising:
a fourth ordinary node, comprising a fourth forward port, a fourth backward port and a fourth backup port, wherein the fourth forward port is connected to the third backward port; and
a fifth ordinary node, comprising a fifth forward port, a fifth backward port and a fifth backup port, wherein the fifth forward port is connected to the fourth backward port, and the fifth backup port is connected to the second backup port;
wherein the first ordinary node, the second ordinary node, the third ordinary node, the fourth ordinary node and the fifth ordinary node are connected in series.

3. The network system of claim 1, further comprising:
a last node, comprising a last forward port, a last backward port and a last backup port, wherein the last backward port is not connected to any node.

4. The network system of claim 3,
wherein the network system comprises ordinary nodes comprising the first ordinary node, the second ordinary node, and the third ordinary node;
wherein all of the ordinary nodes are connected in series;
wherein the last backup port is connected to a backup port of the ordinary node that is separated by one or two nodes from the last node.

5. A network system, comprising:
a control node;
a first head node, comprising a first head forward port, a first head backward port and a first head backup port, wherein the first head forward port is connected to the control node;
a last node, comprising a last forward port, a last backward port and a last backup port, wherein the last backward port is not connected to any node;
a plurality of ordinary nodes which are connected in series between the first head node and the last node, wherein each of the ordinary nodes comprises a forward port, a backward port and a backup port;
wherein the forward port of a first one of the ordinary nodes is connected to the first head backward port;
wherein the forward port of each one of ordinary nodes subsequent to the first one of the ordinary nodes is connected to the backward port of a previous one of the ordinary nodes;
wherein the backward port of a last one of the ordinary nodes is connected to the last forward port;
wherein the backup port of at least one of the ordinary nodes is connected to the backup port of the ordinary node that is subsequent and separated by one or two nodes;
wherein the first head backup port is connected to the backup port of the one of the ordinary nodes that is subsequent to the first head node and separated by one or two nodes from the first head node.

6. The network system of claim 5, further comprising:
a second head node, comprising a second head forward port, a second head backward port and a second head backup port, wherein the second head forward port is connected to the control node, the second head backward port is not connected to any node, and the second head backup port is connected to the backup port of the first one of the ordinary nodes.

7. The network system of claim 5, wherein the last backup port is connected to the backup port of the ordinary node that is separated by one or two nodes from the last node.

8. The network system of claim 5, wherein the backup port of the ordinary node that is not the first one of the ordinary nodes and is with an odd number is connected to the backup port of the ordinary node that is previous and is separated by two nodes, or connected to the first head backward port.

9. The network system of claim 5, wherein the backup port of the ordinary node with a non-maximum even number is connected to the backup port of the ordinary node that is subsequent and is separated by two nodes, or connected to the last backup port.

10. The network system of claim 5, wherein the backup port of the ordinary node with a maximum even number is not connected to any node if the ordinary node with the maximum even number is not separated by any node from the last node, wherein the backup port of the ordinary node with the maximum even number is connected to the last backup port if the ordinary node with the maximum even number is separated by one node from the last node.

* * * * *